(No Model.)

J. KARNATZ, Jr. & J. A. BUDLONG.
VEHICLE SPRING.

No. 251,239. Patented Dec. 20, 1881.

WITNESSES—
F. B. Townsend
S. H. Cavanaugh

INVENTOR—
John Karnatz Jr
Jos A Budlong
By A Mc Stout

UNITED STATES PATENT OFFICE.

JOHN KARNATZ, JR., AND JOSEPH A. BUDLONG, OF JEFFERSON, ILLINOIS.

VEHICLE-SPRING.

SPECIFICATION forming part of Letters Patent No. 251,239, dated December 20, 1881.

Application filed February 5, 1881. (No model.)

*To all whom it may concern:*

Be it known that we, JOHN KARNATZ, Jr., and JOSEPH A. BUDLONG, of Jefferson, county of Cook, and State of Illinois, have invented certain Improvements in Springs for Wagons, of which the following is a specification.

The object of our invention is to provide springs for market-wagons so mounted and arranged as to secure the following results: first, that the bed of the same may be seated as low as possible to facilitate loading and unloading; second, that their springiness shall be about the same whether the load be light or heavy; third, that they shall be cheap and durable; fourth, that they be easily adapted to such wagons already in use. The great necessity that the beds of such wagons should swing and not jolt results from the tenderness of many fruits and vegetables, as well as from the frailness of the boxes, baskets, jars, and other receptacles in which they are packed for transportation. The devices by means of which we have accomplished these results will be hereinafter described with reference to the accompanying drawings, in which—

Figure 1:
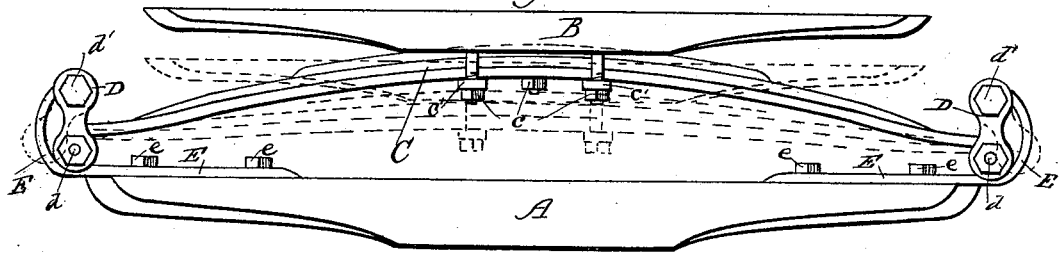
Figure 2:
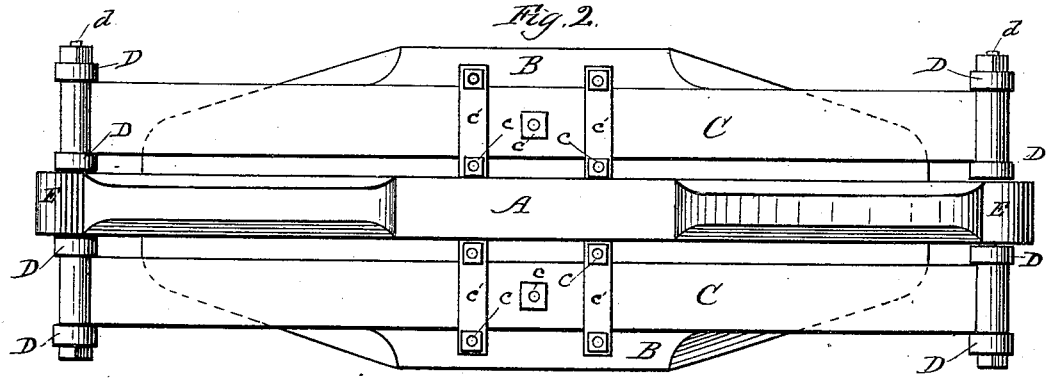
Figure 3:
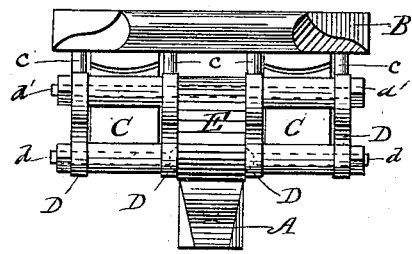
Figure 4:
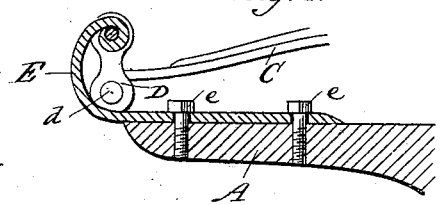

Figure 1 represents a side elevation of a pair of semi-elliptic springs mounted one upon each side of the bolster; Fig. 2, a bottom view of the same; Fig. 3, an end view; and Fig. 4, a side view, in detail, of one end of the same, partly in sections.

C C indicate the two springs constituting the pair, and B a bottom piece attached thereto by screw-bolts $c'$ $c'$, upon which the bottom of the bed of the wagon rests.

E indicates bars fastened upon the bolsters A by means of bolts $e$, and are provided with eye-holes in their outer ends, through which the hinge-rods $d'$ are passed.

D D are links which connect the said hinge-rods $d'$ with the other like hinge-rods, $d$, which pass through the like eye-holes with which each spring is provided at each end. A pair of these links is used at each end of each spring, and are held asunder to prevent side friction by loose sleeves.

The bars E may be curved into the form shown in the drawings, or may be nearly straight, with their eye-holes nearly on a level with the bolster. The form shown, however, is the one preferred by us.

In Fig. 1 the broken lines indicate the position of the links and the springs when the latter are compressed by the weight of the load on the body. The outer ends are provided with the eye-holes for the rods upon which the springs are suspended, for the especial object of having the springs as long as possible, so as to extend beyond the body and nearly to the spokes of the wheels on each side, and thus secure greater scope of action for them and less straining or wearing action upon their material, and being hung one upon each side of the bolster, their compression is not prevented by it, and the manner in which they are suspended upon the hinge-rods will allow of their being compressed even into straight lines without any grinding action, and their being mounted in pairs, one upon each side of the bolster, secures general steadiness, and especially prevents rocking to and fro from front to rear, and thus the twisting of the springs themselves.

We are aware that it is not new to hang pairs of semi-elliptical springs one on each side of the bolster of a wagon, and also that bars having the general form of our bars E, but having their eye-holes in their inner ends instead of their outer ends, and being fastened upon the axles of wagons instead of the bolsters, are not new. We do not, therefore, claim these constructions, broadly; but What we do claim, and desire to secure by Letters Patent, is—

The combination of the bolster A, having bars E attached thereto, the outer ends of which bars extend outwardly as far as they may do without touching the wheels of the wagon, and have eye-holes in them, and the pair of equal springs C C, one on each side of the bolster, and provided with eye-holes in their outer ends corresponding with those in the bars F, the springs and bars being hinged together by means of links D and rods $d$ and $d'$, substantially as and for the purpose described.

JOHN KARNATZ, JR.
JOSEPH A. BUDLONG.

Witnesses:
WM. HEADLAM, Jr.,
A. M. STOUT.